US008302481B2

(12) United States Patent
van der Linden

(10) Patent No.: US 8,302,481 B2
(45) Date of Patent: Nov. 6, 2012

(54) SELF-SUPPORTING AND SELF-ALIGNING VIBRATION EXCITATOR

(76) Inventor: Petrus Johannes Gerardus van der Linden, Diest (BE)

( * ) Notice: Subject to any disclaimer, the term of this patent is extended or adjusted under 35 U.S.C. 154(b) by 223 days.

(21) Appl. No.: 12/855,810

(22) Filed: Aug. 13, 2010

(65) Prior Publication Data

US 2010/0300206 A1 Dec. 2, 2010

Related U.S. Application Data

(62) Division of application No. 11/815,740, filed as application No. PCT/NL2006/000062 on Feb. 7, 2006, now Pat. No. 7,793,547.

(51) Int. Cl.
*G01M 7/00* (2006.01)

(52) U.S. Cl. ........................................... 73/662; 73/649

(58) Field of Classification Search .................... 73/662, 73/514.01, 649, 650, 660, 783
See application file for complete search history.

(56) References Cited

U.S. PATENT DOCUMENTS 2,919,624 A 1/1960 Lindemann et al.
2,936,064 A 5/1960 Schuessler
2,955,460 A * 10/1960 Stevens et al. .................. 73/665
3,243,995 A * 4/1966 Wirt ................................ 73/671
3,518,766 A * 7/1970 Burt ................................ 433/86
4,741,231 A * 5/1988 Patterson et al. ............... 82/118
5,040,666 A 8/1991 Patel
5,520,061 A 5/1996 Thibault et al.
5,969,270 A * 10/1999 Doemes et al. .......... 73/862.626
6,936,209 B2 8/2005 Jackson et al.
7,289,634 B2 10/2007 Grove
7,793,547 B2 9/2010 van der Linden
7,854,903 B2 * 12/2010 Eberle .......................... 422/130
2004/0105556 A1 6/2004 Grove
2009/0314075 A1 12/2009 Albohr et al.

FOREIGN PATENT DOCUMENTS

JP 08226866 * 3/1996
JP 02000131185 * 5/2000

* cited by examiner

*Primary Examiner* — J M Saint Surin
(74) *Attorney, Agent, or Firm* — Ryan A. Schneider, Esq.; Troutman Sanders LLP

(57) ABSTRACT

A vibration excitator including a main body, a stinger which is adapted to move relative to the main body, in a particular working direction, an actuator coupled to the main body and the stinger, wherein the stinger has a first end that is coupled to the main body, and an opposite second end that is intended for attachment to an object to be examined, wherein the stinger has an elastic center point, wherein the main body has a center of gravity, and wherein L1=L3 applies, wherein L1 is the distance between the elastic center point and the second stinger end, measured along the said working direction, and wherein L3 is the distance between the center of gravity and the second stinger end, measured along the said working direction.

5 Claims, 9 Drawing Sheets

SELF-SUPPORTING AND SELF-ALIGNING VIBRATION EXCITATOR

Figure 1:
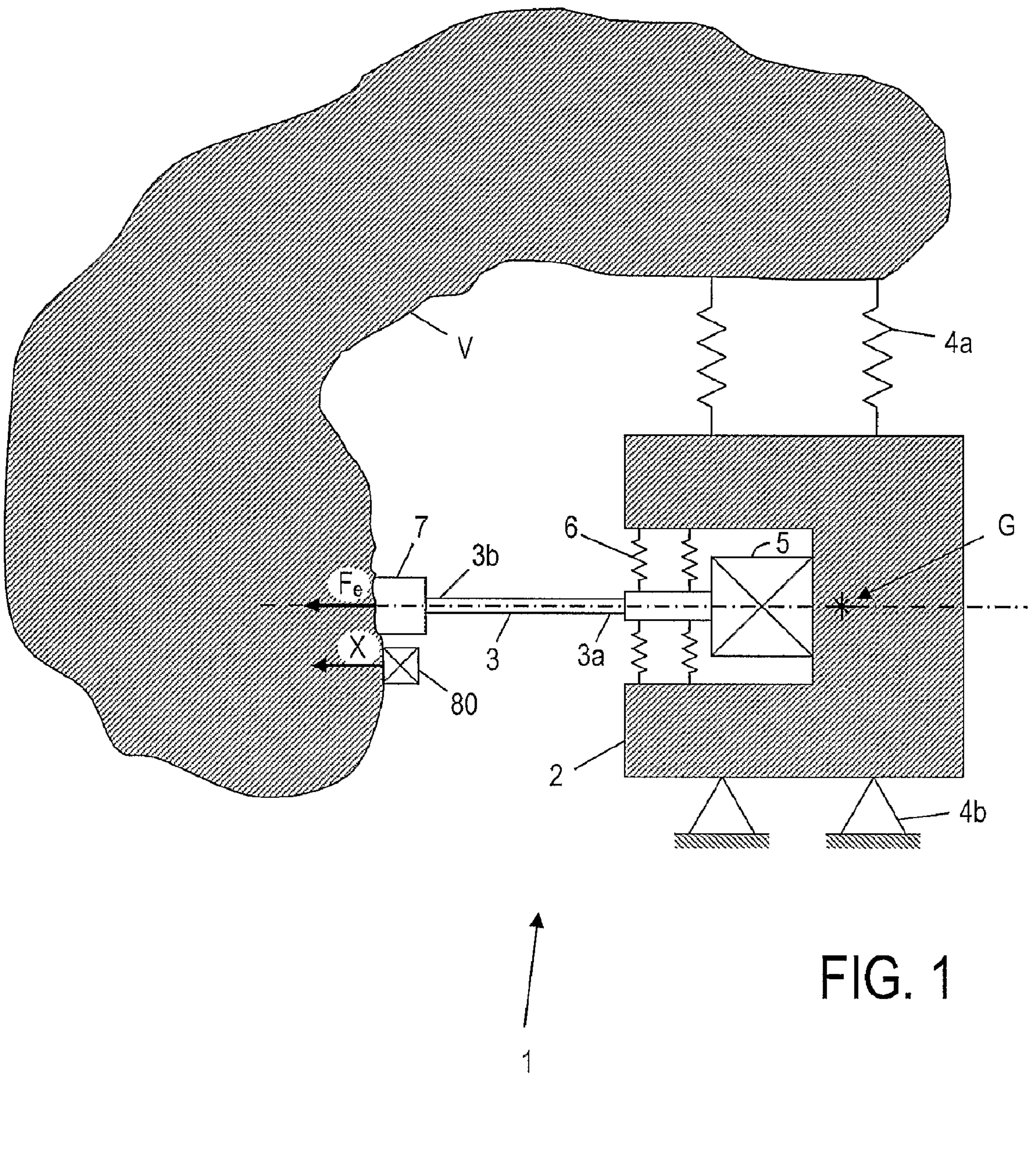

The invention relates in general to apparatus for performing measurements on vibration behaviour of objects, such as for example body parts of a car. In this context, the object to be examined, hereinafter indicated as measuring object, is set into vibration, and it can for example be measured how much sound the part emits. The measuring object is set into vibration by exerting an oscillating or at least dynamic force at a well-defined location. In order to be well able to say something about the vibration behaviour, it is desired that one knows accurately to which force the measuring object is subjected, i.e. the direction of that force and the fluctuation of the magnitude of that force as function of that time.

The present invention more particularly relates to an apparatus intended to subject measuring objects to be examined to a well-defined vibration force, in a controlled way. In this field, such an apparatus, which will hereinafter be indicated as “vibration excitator”, is normally indicated by the English phrase “shaker”. As vibration excitators are known per se, it is not necessary here to give an extensive discussion thereof.

A vibration excitator comprises a main body, which has a relatively large mass, and which is intended to serve as counterweight and/or to be supported, for example to be supported by the fixed world or by the measuring object to be examined. Furthermore, a vibration excitator comprises a dynamic part intended to establish an excitation coupling between the vibration excitator and the measuring object to be examined by exerting a vibration force. This dynamic part, which is normally indicated by the English phrase “stinger”, is capable of moving relative to that main body, and has elastic properties in order to prevent the vibration behaviour of the measuring object to be examined from being disturbed. Furthermore, a vibration excitator comprises a drive member, for example an electromechanic converter, a hydraulic-mechanic converter, a pneumatic-mechanic converter, which drive member causes the main body and the stinger to move relative to each other on the basis of a control signal, at least exerts a mutual force on the main body and the stinger.

In order to be able to measure precisely how large the exerted force is, and/or to be able to measure precisely how large the displacement/acceleration of the measuring object is at the location of the force, one or more sensors are provided, which may be built in in the stinger.

Existing vibration excitators have some drawbacks and/or limitations.

A first limitation relates to the magnitude of the force that can be transmitted. It is desired to be able to transmit larger forces, but to that end, it is necessary to make the main body larger and to make the vibration amplitude of the stinger larger relative to the main body, which requires more space. As shakers are applied for testing existing constructions, there is often only a limited space available, so it is desired that the dimensions of the shaker are as small as possible.

Furthermore, it is desired that a vibration excitator is usable for all locations and orientations. Most existing vibration excitators are only usable in a single or a small number of orientations, and it is not possible, or only in a complex way, to attach such an existing vibration excitator to a measuring object in any orientation and at any location. Good vibration excitators are precision instruments having a high price. A vibration excitator which is usable in multiple locations and in any orientation means a considerable saving in costs. In this context, it is a problem that the main body of the vibration excitator itself is subjected to the gravitational force. In particular, this is a problem for self-supporting vibration excitators, i.e. vibration excitators which are connected to the measuring object through the stinger only and of which the main body is not supported to the fixed world or to the measuring object. Thus, in that case, the weight of the main body is carried by the stinger, which may deform as a result thereof, wherein the deformation depends on the orientation. As a consequence of such a deformation, it may occur that the exerted force is not correctly aligned anymore, which may have all kinds of undesired effects which may adversely influence the examination result. In order to prevent such deformations, one could attach the main body to the measuring object through additional attachment means, but the use of such additional attachment means has the disadvantage that installing the vibration excitator is more complex and that an undesired influence is exerted on the measuring object to be examined.

It is noted that there are vibration excitators which are self-supporting, but without stinger, so that they do not (or hardly) deflect (come out of position) under influence of the gravitational force. However, in that case, the measuring object to be examined can not vibrate freely, and the vibration behaviour of the measuring object to be examined is influenced by the vibration excitator.

The stinger should be designed in such a way that it can transmit oscillating pressure and tensile forces in the vibration direction, and that it is flexible in all other degrees of freedom (such as translation in transverse direction; and all rotation directions) in order to hinder the measuring object in the directions concerned as little as possible in performing a free vibration, and in order to minimise force components in those directions concerned. Because of this, a vibration excitator is vulnerable. In use, the force-transmitting end of the stinger is fastened to the measuring object by means of glue or by means of a screw connection or another connection. In installing, and later removing the vibration excitator, the stinger is subjected to forces that could damage the stinger and/or the internal construction of the main body of the vibration excitator.

There are vibration excitators, wherein a vibration sensor, which measures the vibration movement performed by the measuring object, is to be attached to the measuring object next to the stinger. As such a sensor is only sensitive to the vibration at the location of its attachment point, a disadvantage of such a mounting of the vibration sensor is that it can not measure the vibration behaviour at the location loaded by the stinger. There are also vibration excitators, wherein a vibration sensor is built in in the end of the stinger. In that case, however, that vibration sensor experiences an influence of the force exerted by the stinger, which influences the measuring signal of the sensor.

It is a general objective of the present invention to provide an improved vibration excitator.

In particular, the present invention aims at providing a vibration excitator that can be attached quickly an easily to a measuring object to be examined, at any location and in any orientation, wherein it is not necessary to support the vibration excitator externally.

In particular, the present invention aims at providing a vibration excitator which is capable of exerting an accurately known force in an accurately known direction and at an accurately known location.

In particular, the present invention aims at providing a vibration excitator that enables accurate measurement of the exerted force and the induced vibration movement of the measuring object.

According to a first aspect of the present invention, the main body is free from support relative to the fixed world or the measuring object to be examined, and the full weight of the main body is carried by the stinger. The stinger is designed in such a way that at least one parameter of the exerted force is always well-defined and known, and corresponds to design criteria. That parameter may for example be the direction of the force, or the point of action. Because of the absence of external support members, apart from a saving of costs, a reduction of the need for space is attained. Furthermore, because of this, installing the vibration excitator becomes simpler, as no actions for installing and attaching to such support members need to be performed.

According to a second aspect of the present invention, the force-transmitting end of the stinger is provided with a sensor, and means are provided to divert the forces to be exerted on the measuring object by the stinger largely around the sensor. Because of this, the sensor can supply measuring data more accurately.

Figure 2A:
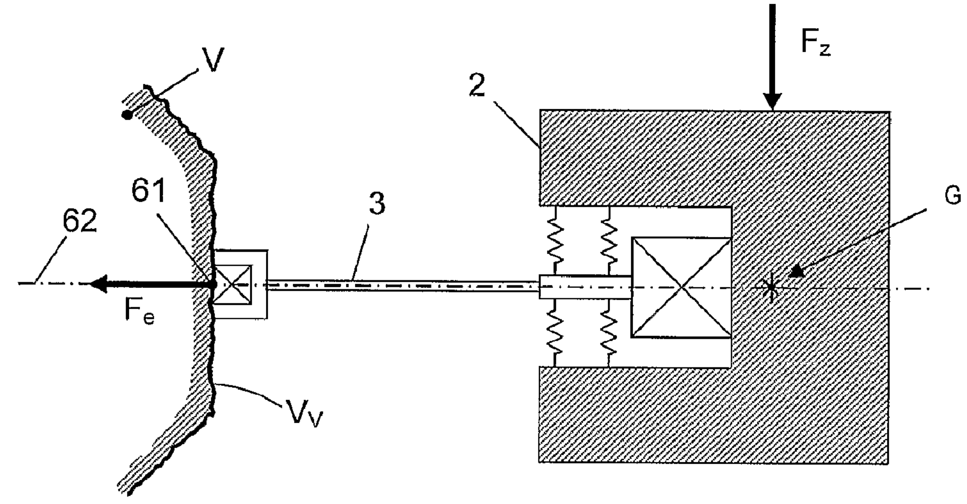
Figure 2B:
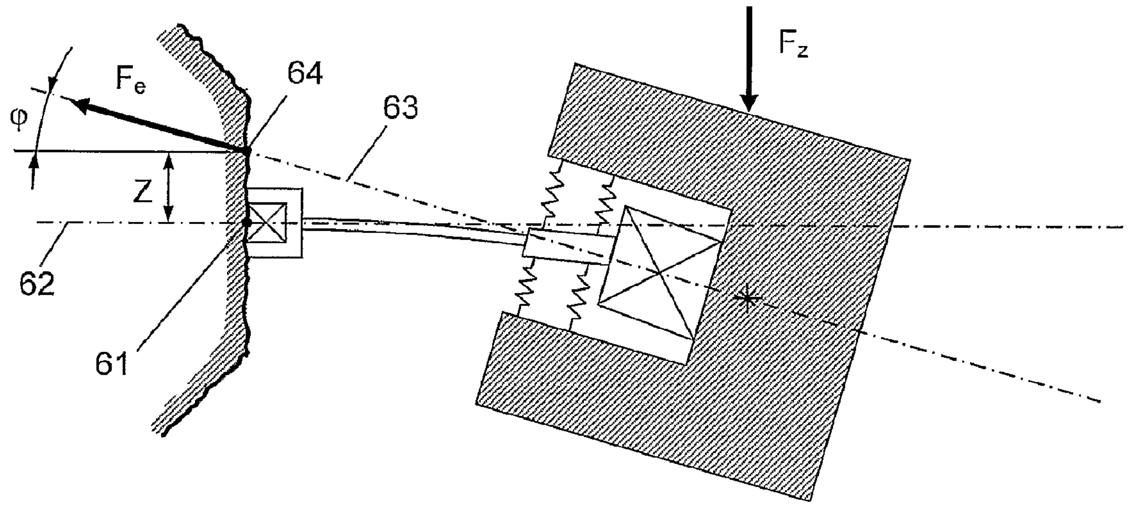
Figure 4A:
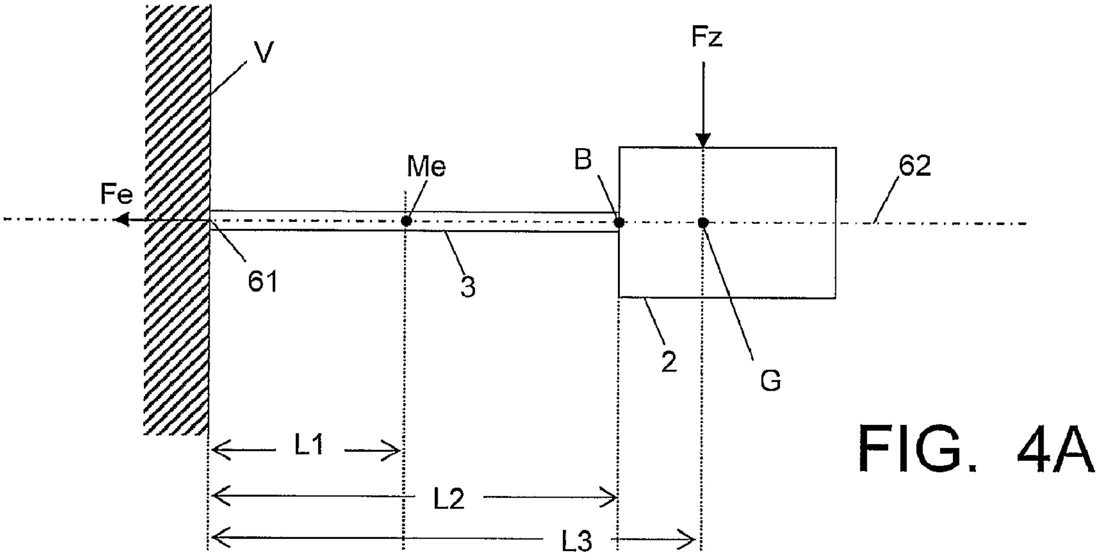
Figure 4B:
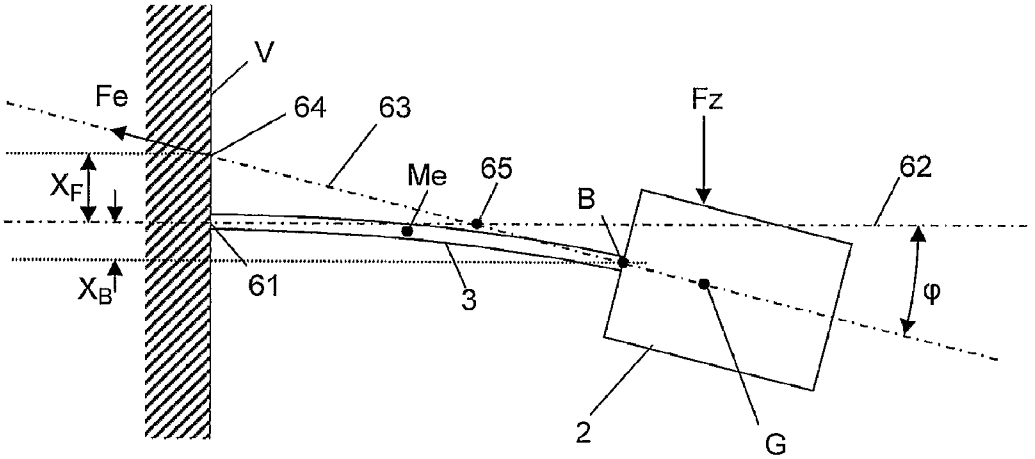
Figure 5A:
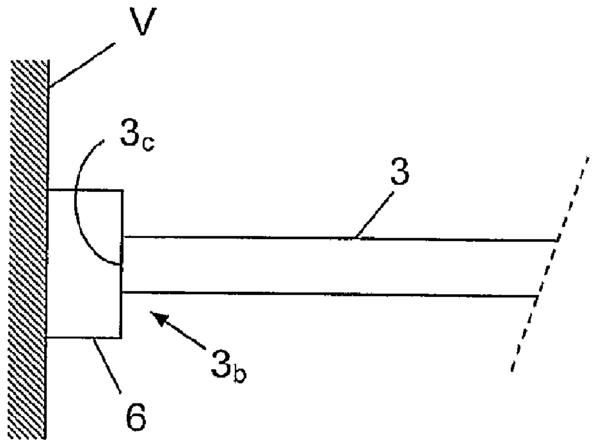
Figure 5B:
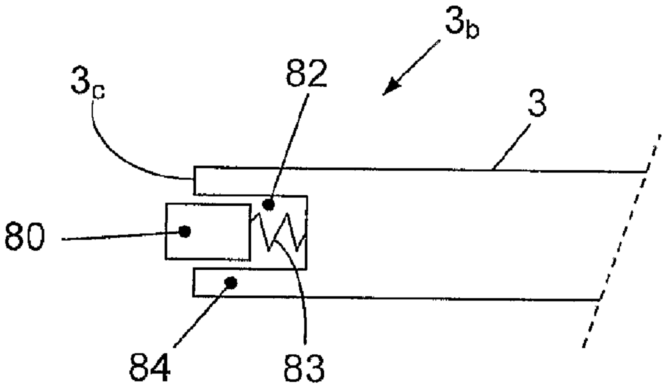
Figure 5C:
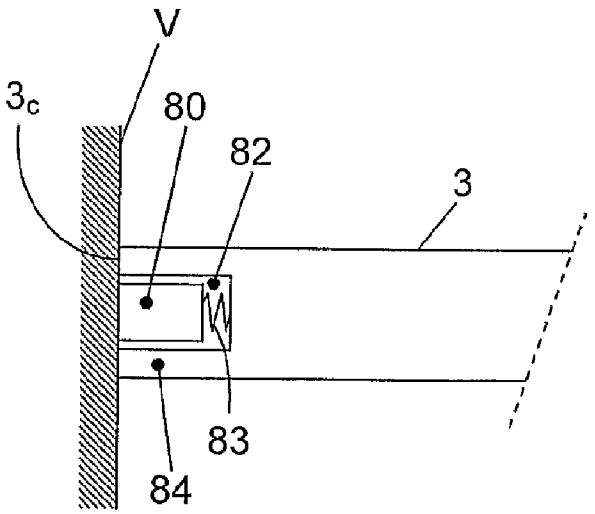
Figure 5D:
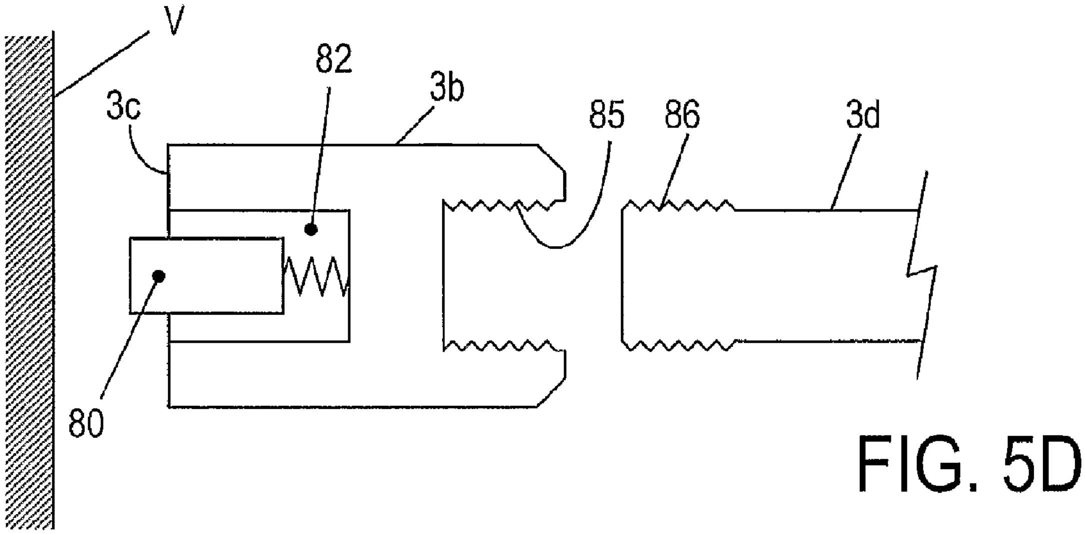
Figure 5E:
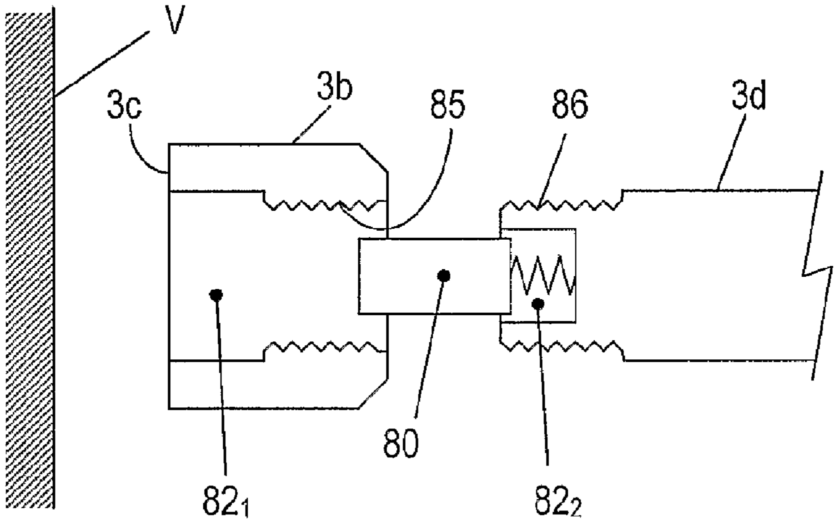
Figure 5F:
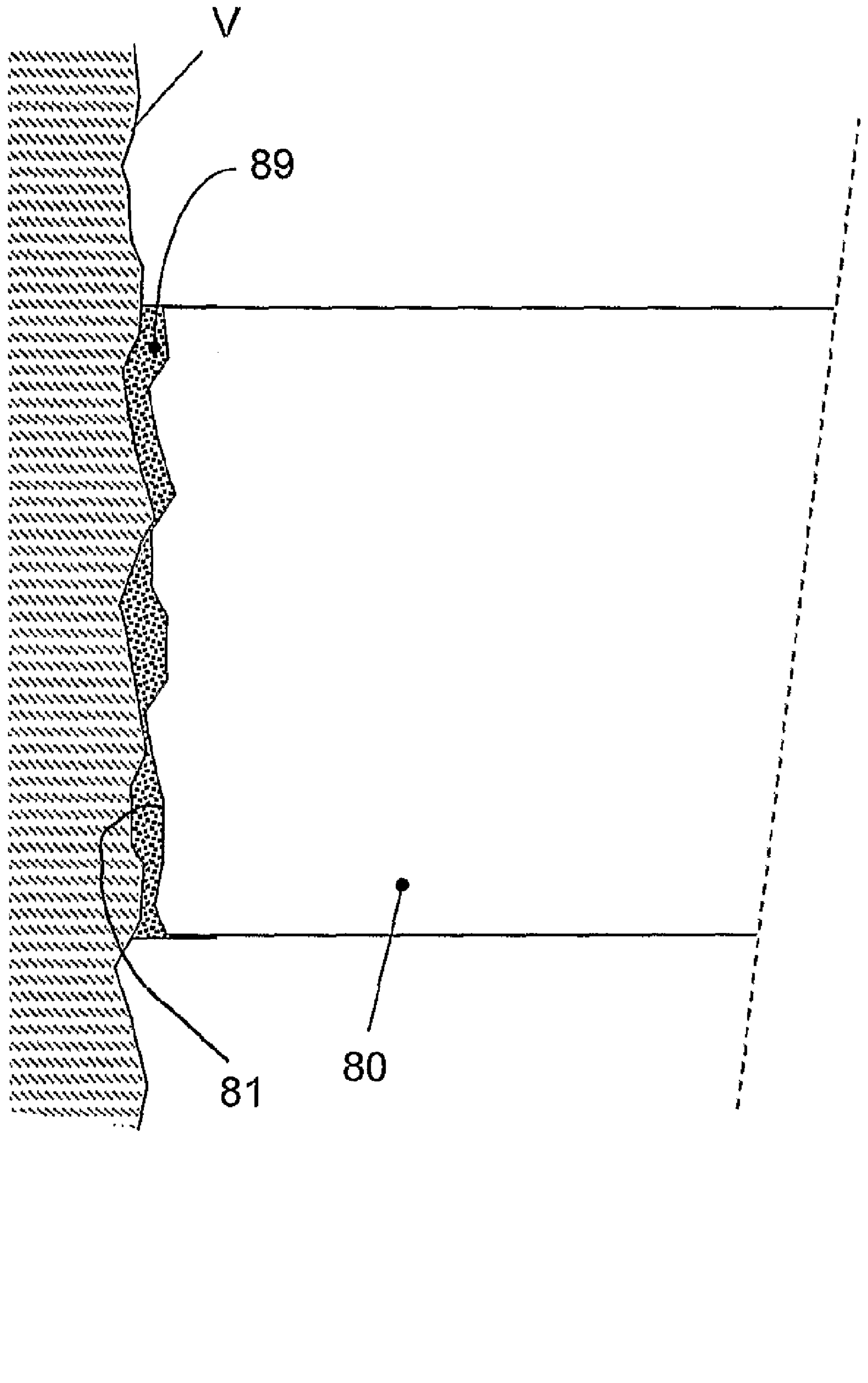
Figure 5G:
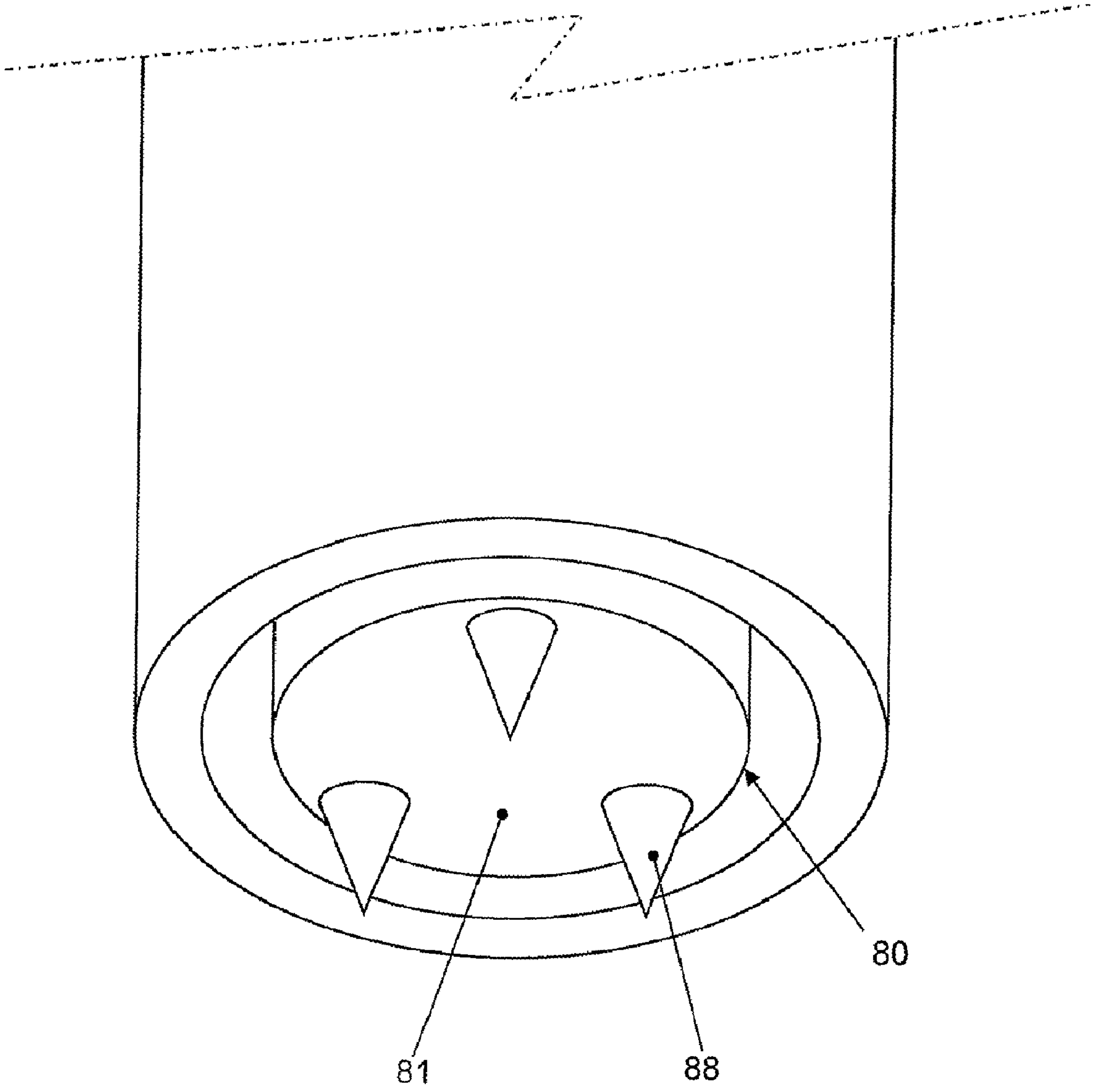

These and other aspects, features and advantages of the present invention will be further explained by the following description with reference to the drawings, in which same reference numerals indicate same or similar parts, and in which:

the FIGS. 1 and 2A-B schematically illustrate the principle of a known vibration excitator;

the FIGS. 3A-D schematically illustrate the definition of an elastic centre point;

the FIGS. 4A-B schematically illustrate several aspects of a vibration excitator according to the present invention;

FIG. 5A schematically illustrates a known construction of a stinger end with sensor;

the FIGS. 5B-E schematically illustrate details of a construction of a stinger end with integrated sensor proposed by the present invention;

FIG. 5F schematically illustrates the application of a highly viscous substance for improving the contact between pick-up and measuring object;

FIG. 5G schematically illustrates the application of specially shaped contact points on the front face 81 of the pick-up 80;

the FIGS. 6A-6D illustrate further implementations of the present invention.

FIG. 1 schematically illustrates a vibration excitator 1 according to a known design, for performing a vibration examination on a measuring object V. The vibration excitator 1 comprises a relatively heavy main body 2, which is attached to the measuring object V by means of attachment members 4$a$ and/or to the fixed world by means of attachment members 4$b$. Furthermore, the vibration excitator 1 comprises a stinger 3 adapted to transmit a vibration force to the measuring object V in a direction which will be indicated as working direction, which is directed horizontally in the figure. To that end, the vibration excitator 1 comprises a drive member 5, which will hereinafter also be indicated as actuator, which engages on the main body 2 and on a first end 3$a$ of the stinger 3, and which is adapted to exert a mutual force on the main body 2 and the stinger 3, in the working direction. The actuator 5 may for example be an electromechanic converter, or a hydraulic-mechanic converter, or a pneumatic-mechanic converter, or another suitable type. The exerted force depends on a control signal received by the actuator, which signal is not shown in the figure for the sake of simplicity. If the control signal is oscillating, the force will be oscillating, and stinger 3 and main body 2 will perform a vibration relative to each other in the working direction. In order to enable this relative vibration movement, the vibration excitator 1 comprises guide members 6.

A second end 3$b$ of the stinger 3, opposite the first end 3$a$, is in contact with the measuring object V, directly or via a sensor 7. The force induced by the actuator 5 is transmitted by the stinger 3 to the measuring object V (indicated by arrow Fe), and results in a vibration of the measuring object; the component of this vibration that is parallel to the working direction of the vibration force Fe, indicated by the arrow X in the figure, is measured. A vibration sensor arranged on the measuring object V next to the stinger 3 is shown at 80.

The stinger 3 is relatively stiff in the working direction, in order to be able to well transmit the force Fe. In the two transverse directions and in all rotation directions, the stinger 3 is relatively flexible in order to prevent forces in directions different than the working direction from being induced, and in order to prevent the vibration behaviour of the measuring object V from being disturbed by the mass and stiffness of the whole vibration excitator.

For the purpose of a good operation, it is of importance that the stinger 3, in the directions perpendicular to the working direction, has elastic properties to a sufficient extent. As described in the foregoing with reference to FIG. 1, the first end 3$a$ of the stinger 3 is coupled to the main body 2 by means of guide members 6 and actuator 5, and those guide members 6 and actuator may provide some elasticity in the directions perpendicular to the working direction, but this is usually insufficient. Therefore, it is desired that the stinger 3 itself, between its both ends 3$a$ and 3$b$, is implemented in such a way that the second end 3$b$ can move relative to the first stinger end 3$a$ in an elastic way. Therefore, the stinger 3 preferably comprises, between its both ends 3$a$ and 3$b$, at least one resilient element, for example a bar with a relatively small diameter, an elastomer coupling block, etc.

The main body 2 can be attached to the measuring object V to be examined and/or the fixed world in the usual way (attachment means 4$a$, 4$b$; see FIG. 1). However, attaching both the main body 2 and the stinger 3 is rather laborious. According to a first aspect of the invention, it suffices to only attach the stinger 3 to the measuring object V to be examined. The main body 2 is then free from the measuring object V and from the environment, and the full weight of the main body 2 is carried by the stinger 3. This is schematically illustrated in FIG. 2A, which is comparable to FIG. 1, on the understanding that the supports 4$a$ and 4$b$ are omitted. The centre of gravity of the vibration excitator 1 is indicated at G; the gravitational force is represented by arrow $F_z$.

In FIG. 2A, the working direction of the force to be exerted is directed horizontally, and the vibration excitator 1 is drawn in a position it would take if it would be weight-less. At an attachment point 61, the second end 3$b$ of the stinger 3 is fastened to a vertical plane Vv of the measuring object V to be examined. A perpendicular line on that vertical plane Vv through said attachment point 61 is indicated at 62. The longitudinal axis of the stinger 3 is aligned with that perpendicular line 62. When the actuator 5 is energized, the force F exerted on the measuring object V by the stinger 3 will engage in the said point 61, and will be directed along said perpendicular line 62.

However, in reality, the vibration excitator 1 is not weightless. As a consequence of the fact that the weight of the main body 2 is carried by the stinger 3, the stinger 3 will deform. Also at the guide members 6 and the actuator 5, to a less or more extent, a deformation will occur. This is illustrated in FIG. 2B. FIG. 2B illustrates a situation wherein the stinger 3 is bent in the same direction over its entire length. The force to be exerted by the stinger now has a direction 63 determined by the orientation of the actuator 5, which direction is at an angle with the intended direction (perpendicular line 62) and intersects the vertical plane Vv in a point 64 displaced relative to the intended point of action 61.

The present invention aims to offer a solution to this problem. To that end, according to the present invention, the house is designed in such a way that the balancing thereof is adapted to the elastic behaviour of the stinger, whether or not in combination with the elastic behaviour of the guide members and actuator in the vibration excitator.

In the following explanation of this aspect, the combination of the elastic stinger, the guide members and the actuator will be indicated as stinger combination 30. This stinger combination 30, which is shown in a simplified fashion as a bar in the FIGS. 4A-B, will be conceived as an elastic body having an elastic centre point Me. The main body 2 will be considered as a rigid body having a centre of gravity G, of which the position is stationary relative to the main body 2. In a first approximation, the position of the elastic centre point Me will be considered as being stationary relative to the stinger combination 30. The main body 2 is supported on support point B by the stinger combination 30.

Figure 3A:
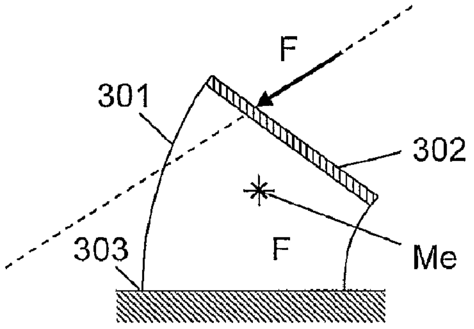
Figure 3B:
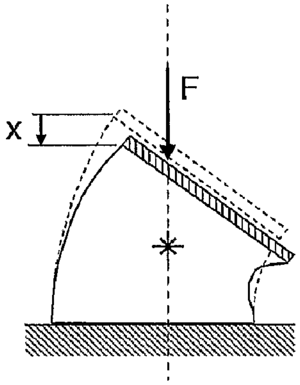
Figure 3C:
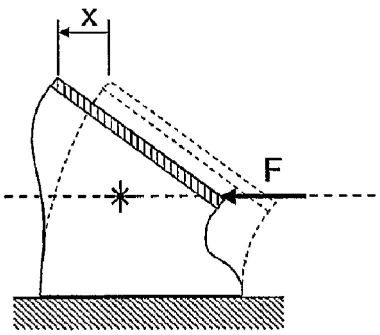
Figure 3D:
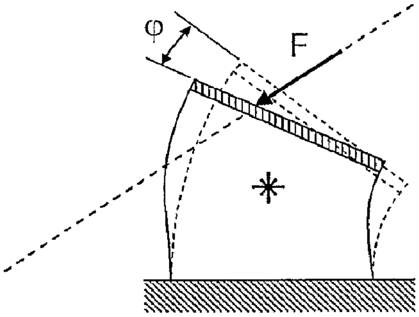

Referring to the FIGS. 3A-D, the elastic centre point Me of an elastic body 301 is defined as follows. An elastic body 301 is provided with a stiff plane of action 302, and is fixedly attached to the fixed world at 303. A small force F acts on the stiff plane of action 302, which force is directed according to a force line 304. If the force line 304 intersects the elastic centre point Me, the force F results in a translation displacement of the plane of action 302 (FIGS. 3B and 3C). If the force line 304 does not intersect the elastic centre point Me, the force F results in a translation and a rotation of the plane of action 302 (FIG. 3D).

In FIG. 4A, the vibration excitator 1 is shown in a neutral position, comparable to FIG. 2A. The distance from the elastic centre point Me to the attachment point 61 is indicated by L1 (the shape of the stinger 3 and the stinger combination 30 are not critical in this context; the same applies to the construction as an elastic bar or with other elastic means). The distance from the support point B to the attachment point 61 (i.e. the length of the stinger combination 30) is indicated by L2. The distance from the centre of gravity G to the attachment point 61 is indicated by L3.

The stinger combination 30 has a stiffness Kx [N/m] for translation in vertical direction, and the stinger combination 30 has a stiffness Kp [Nm] for angular deflection.

As a consequence of the gravitational force Fz, the attachment point B will drop over a distance $X_B$ according to the formula:

$$X_B = Fz/Kx \qquad (1)$$

The gravitational force Fz exerts a bending moment M on the stinger combination 30 according to the formula:

$$M = Fz \cdot (L3 - L1) \qquad (2)$$

As a consequence of the bending moment M, the main body will rotate over an angle ϕ according to the formula:

$$\phi = M/Kp \qquad (3)$$

This is also the angle of the excitation force $F_e$ to be exerted by the stinger combination 30 relative to the intended direction (see FIG. 2B).

The point of action 64 of this excitation force $F_e$ is shifted upwards relative to the intended point of action 61 over a distance $X_F$ according to the formula:

$$X_F = \frac{F_Z}{K_X} - \frac{F_Z \cdot L2 \cdot (L3 - L1)}{K_P} \qquad (4)$$

In FIG. 4B, the intersecting point of the force direction 63 with the intended direction 62 is indicated at 65; one can clearly see that this intersecting point 65 is situated in front of the measuring object V, i.e. at the side of the front face of the measuring object V facing the body 2.

Both shifting the point of action 64 of the excitation force $F_e$ and rotating the force direction 63 lead to measuring errors. Depending on the circumstances, the influence of shift of the point of action 64 may be larger than the influence of rotation of the force direction 63, or the other way around. If rotation of the force direction 63 of the excitation force $F_e$ is the most important source of errors, the present invention provides an optimization wherein the excitation direction 63 always remains parallel to the intended direction 62. To that end, in a first embodiment variation of a vibration excitator according to the present invention, the construction of the main body 2 with all parts fixedly connected thereto, including the actuator 5, is designed in such a way that the centre of gravity of this construction, with unloaded stinger combination 30, is situated in a vertical plane through the elastic centre point Me, which plane is directed perpendicular to the longitudinal axis of the stinger. This plane will be indicated as "bending centre plane". In that case, L1=L3 applies, and ϕ=0 applies according to formulas 2 and 3. The said intersecting point 65 will then be situated in infinity, beyond the measuring object V. The point of action 64 of the excitation force Fe is then shifted downwards over the distance $X_B$.

Preferably, that centre of gravity is situated on a vertical line through the elastic centre point Me, which line is situated in said vertical bending centre plane, or at only a small horizontal distance from that vertical line. In order to be usable in all orientations, from purely horizontal to purely vertical, the said centre of gravity G preferably coincides with the elastic centre point Me.

If the stinger 3 is implemented as a homogeneous bar, and the elastic deformations in the guidance and the actuator are negligibly small, for an optimal and ideal construction, wherein the intersecting point 65 is situated in infinity, L2=2·L3 applies.

If shifting of the point of action 64 of the excitation force F is the most important source of errors, the present invention provides an optimization wherein the point of action 64 of the excitation force F always coincides with the intended point of action 61. To that end, in a second embodiment variation of a vibration excitator according to the present invention, the construction of the stinger is designed in such a way that the elastic centre point Me is situated at a position that complies with $$L2 = \frac{1}{(L3 - L1)} \cdot \frac{K_P}{K_X} \qquad (5)$$

In this case, $X_F$=0 applies according to formula 4.

The said intersecting point 65 will then coincide with the front face of the measuring object V. Then, the point of action 64 of the excitation force Fe is not shifted.

If the stinger 3 is implemented as a homogeneous bar, and the elastic deformations in the guidance and the actuator are negligibly small, for an optimal and ideal construction, wherein the intersecting point 65 coincides with the front face, L2=1.5·L3 applies.

Besides the said optimizations, the present invention already provides an improvement if the point of action 64 of the excitation force Fe is shifted downwards, over a distance at most being equal to $X_B$. In that case, the said intersecting point 65 will always be located beyond the front face of the measuring object V, i.e. at the side of the front face of the measuring object V which is directed away from the body 2. Thus, in this case, the following applies in general:

$$L1 \leq L3 \leq L1 + \frac{K_P}{K_X \cdot L2} \tag{6}$$

As is noted in the foregoing, for the purpose of examining the measuring object V, it is often necessary to provide it with a pick-up, in order to be able to measure the vibration movement actually performed by the measuring object at the location of and in the direction of the excitation. The pick-up may comprise an absolute or relative acceleration pick-up, velocity pick-up, displacement pick-up, etc. Such a pick-up may be located next to the stinger 3 (as indicated in FIG. 1), but a disadvantage of such an arrangement is that measuring takes place at a measuring position deviating from the intended measuring position, namely the location where the stinger 3 engages. Furthermore, it is a disadvantage that two parts have to be connected to the measuring object to be examined.

Therefore, it is known per se to integrate a pick-up in the end 3*b* of the stinger 3, and to possibly even integrate it with a force pick-up measuring the force exerted by the vibration excitator. FIG. 5A schematically illustrates a known arrangement having the measuring object V, the stinger end 3*b*, and a pick-up 6 arranged therebetween, which is fastened to both the measuring object V and to a head end face 3*c* of the stinger end 3*b*, so that the pick-up 6 follows the movements of the measuring object V and the stinger end 3*b*. However, a problem of such a known configuration is that the pick-up is subjected to pressure and tensile forces exerted on the measuring object V by the stinger end 3*b*, which may influence the measuring signal generated by the pick-up 6.

A second aspect of the present invention relates to a solution to these problems, proposed by the present invention, by means of an adapted construction of the second end 3*b* of the stinger 3 which is to be attached to the measuring object to be examined, with integrated sensor. This second aspect may be applied independently of the first aspect discussed in the foregoing.

The FIGS. 5B and 5C illustrate this second aspect at a larger scale. In the head end face 3*c* of the stinger end 3*b*, a recessed sensor accommodation chamber 82 is arranged, in which a pick-up 80 is arranged in such a way that the sensor does not touch the accommodation chamber. The chamber 82 is further provided with elastic means 83 forming the connection between pick-up 80 and stinger end 3*b*; in the example shown, those elastic means 83 are shown as a spring arranged between the acceleration pick-up 80 and the bottom of the chamber 82, but various other embodiments of these elastic means 83 are possible. For example, the elastic means may comprise a membrane suspension or an elastomeric gasket.

The contact between the sensor and the measuring object V may be formed by a magnetic, glued, screwed or other connection, for example. The connection of the head stinger end face 3*c* to measuring object V may be formed for example by a magnetic, glued, screwed or other connection. It is also possible that the contact between the sensor and the measuring object V is attained by a pressing force, in which case there does not need to be a fixed connection between the sensor and the measuring object V.

It is noted that the pick-up 80 is of course provided with one or more signal wires for connection to a signal processing device, but this is not shown in the figures for the sake of simplicity.

The elastic means 83 retain the pick-up 80 relative to the stinger end 3*b* in such a way that, in an unloaded situation (FIG. 5B), the pick-up 80 somewhat projects from the chamber 82, beyond the head end face 3*c*.

When the stinger thus implemented according to the present invention is fastened to the measuring object V (FIG. 5C), the pick-up 80 projecting from the chamber 82 comes into contact with the measuring object V, and is pressed into the chamber 82 by the measuring object V until the head stinger end 3*c* comes into contact with the measuring object V. In the process, as the chamber 82 has a depth (axial dimension) which is larger than that of the pick-up 80, the pick-up does not come into contact with the bottom of the chamber 82. The stinger 3 is rigidly connected to the measuring object V via the walls 84 of the chamber 82. Therefore, the largest part of the dynamic/oscillating force is transmitted from the stinger to the measuring object V via the walls 84 of the chamber 82. Only a small part of the dynamic/oscillating force is transmitted to the pick-up 80 via the elastic means 83.

It is noted that the chamber preferably has transverse dimensions which are larger than those of the pick-up, in order to prevent the pick-up from being able to touch the walls of the chamber if the pick-up tilts in the chamber 82 as a consequence of a surface of the measuring object V not being completely flat.

It will be clear that, in the case of the configuration proposed by the present invention and illustrated in the FIGS. 5B-C, the forces exerted by the stinger 3 on the measuring object V are led via the walls of the chamber 82, and therefore do not or hardly load the pick-up 80.

It is preferred that the configuration, in particular the shape of the remaining end face 3*c*, is rotation-symmetrical relative to the longitudinal axis of the stinger 3, and that the pick-up 80 is substantially centred relative to that longitudinal axis: in that case, namely, the force F exerted by the stinger 3 on the measuring object may be considered as coinciding with the measuring location of the pick-up 80.

In practice, it is possible that the surface of the measuring object V is not completely flat. In such a case, the front face 81 of the pick-up 80 (i.e. the end face of the pick-up 80 facing the measuring object V) will not be in contact with the surface of the measuring object V in an ideal way, and that the vibrations of the measuring object V are not transmitted to the pick-up 80 in the right or expected way.

In order to solve, or at least to reduce this problem, it is possible to apply a conforming, highly viscous substance 89 on the front face 81 of the pick-up 80, such as a liquid, paste, soft synthetic material, glue, or the like. FIG. 5F shows at a larger scale that such a highly viscous substance 89 will fill the intermediate spaces caused by possible unevennesses of the surface of the measuring object V and/or the front face 81 of the pick-up 80 and will thus improve the transmittal of vibrations to the pick-up 80. In this figure, the height differences of the possible unevennesses are drawn exaggeratedly large.

In an alternative solution, the present invention proposes to provide the front face 81 of the pick-up 80 with three contact points 88. The contact points 88 are preferably arranged in a pattern according to an equilateral triangle, near the edge of the front face 81 of the pick-up 80, and each contact point 88 preferably has the shape of a pyramid or cone. FIG. 5G is a schematic perspective view of this construction. Because of these measures, it is ensured that the pick-up 80 always contacts the measuring object V in a defined way, namely at the three contact points 88. It is possible that the front face 81 of the pick-up 80 is provided with multiple contact points, so that, in practice, always at least three contact points make a good contact with the measuring object V, but then it is not always known with certainty which contact points (and how many) will be active.

If desired, the construction of FIG. 5G may be applied in combination with the highly viscous substance of FIG. 5F.

In order to facilitate attaching the stinger 3 to a measuring object, the second stinger end 3*b* is preferably implemented as a detachable attachment member, as illustrated in the FIGS. 5D and 5E. In both figures, the remaining part of the stinger body, i.e. the stinger without the detachable attachment member 3*b*, is indicated by the reference number 3*d*. The detachable attachment member 3*b* has the head end face 3*c* and the sensor accommodation chamber 82. Opposite the head end face 3*c*, the detachable attachment member 3*b* is provided with coupling members 85 matching with coupling members 86 on the free end of the remaining stinger part 3*d*. In a suitable embodiment, as illustrated, the free end of the remaining stinger part 3*d* is provided with an external screw thread 86, and the detachable attachment member 3*b* is provided with a corresponding internal screw thread 85. Alternatively, a click connection may for example be applied, or a magnetic connection, or any other suitable connection.

In the embodiment illustrated in FIG. 5D, the sensor accommodation chamber 82 is completely situated inside the detachable attachment member 3*b*, and the sensor 80 is retained by the detachable attachment member 3*b*. In the embodiment illustrated in FIG. 5E, the sensor accommodation chamber 82 is partly situated inside the detachable attachment member 3*b* ($\mathbf{82}_1$), and partly inside the free end of the remaining stinger part 3*d* ($\mathbf{82}_2$), and the sensor 80 is retained by the remaining stinger part 3*d*.

An important advantage of such a detachable attachment member 3*b* is that one can first fasten that detachable attachment member 3*b* to the measuring object V, and subsequently attach the stinger 3*d* to the attachment member 3*b*. When the shaker needs to be removed, the attachment member 3*b* can remain attached to the measuring object V, for renewed use at a later stage. It is also possible that there are multiple, mutually identical attachment members 3*b*, which, in a preparatory phase, are fastened to the measuring object V at different locations. Then, for the purpose of changing a measuring location, one only needs to remove the stinger 3*d* from the one attachment member 3*b* and fasten it to a next attachment member 3*b*. Mounting and demounting the stinger can thus be performed faster.

The FIGS. 6A-6D illustrate further implementations of the present invention.

Figure 6A:
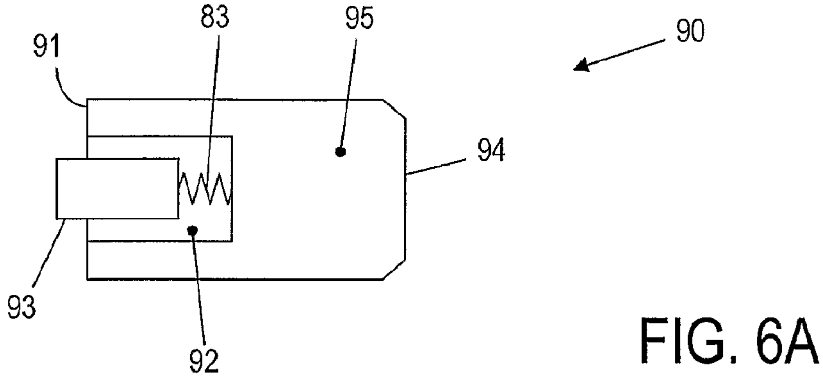

FIG. 6A schematically shows a cross-section of a force transmittal member 90 comprising a force-transmitting body 95 having a head end face 91 intended for mounting on a measuring object to be examined (not shown), and an opposite end face 94 intended for receiving a force. That force may be generated by a stinger, as described in the foregoing, but that force may also be supplied by a hammer, for example. A sensor accommodation chamber 92 is recessed in the head end face 91, with a vibration sensor 93 mounted therein. In respect of the accommodation chamber 92 and the vibration sensor 93, the same as what is mentioned in the foregoing with respect to the chamber 82 and the sensor 80, respectively, applies, so that that does not need to be repeated.

Figure 6B:
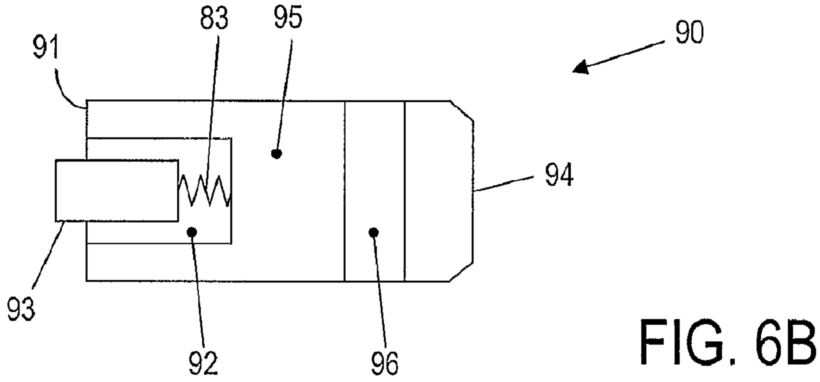

FIG. 6B schematically shows a variant of the force transmittal member 90, in which a force sensor 96 is accommodated between the two end faces 91 and 94, which sensor is adapted for measuring the magnitude of the force transmitted by the force-transmitting body 95 from the force receiving end face 94 to the head mounting end face 91. Such an embodiment of the force transmittal member 90 is also indicated as impedance sensor. As impedance sensors having an integrated force sensor are known per se, a more extensive discussion thereof may be omitted here.

Figure 6C:
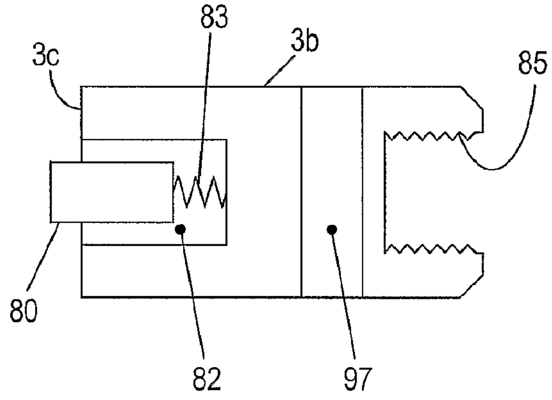

FIG. 6C schematically shows a variant of the detachable attachment member 3*b* implemented as impedance sensor, with a force sensor 97 accommodated therein.

Figure 6D:
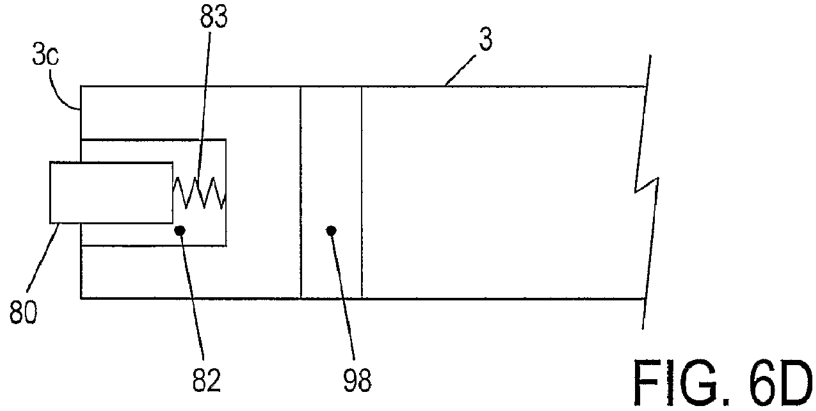

FIG. 6D illustrates that a force sensor 98 may also be accommodated in a stinger 3.

It will be clear to a person skilled in the art that the invention is not limited to the exemplary embodiments discussed in the foregoing, but that several variants and modifications are possible within the protective scope of the invention as defined in the attached claims.

What is claimed is:

1. A detachable end piece for attaching to a stinger body of a stinger of a vibration excitator, the detachable end piece receiving vibration from the stinger body, transferring the vibration to an object to be examined, and sensing a response from the object to the vibration, the end piece comprising:

a head end face for attachment to an object to be examined;

an opposite end opposite the head end face, said opposite end provided with stinger attachment means for detachably attaching the end piece to a stinger body;

a recessed sensor accommodation chamber having walls and a bottom and arranged in the head end face, the recessed sensor accommodation chamber completely situated in the end piece;

a sensor arranged in the recessed sensor accommodation chamber; and elastic means coupling the sensor to the recessed sensor accommodation chamber, the sensor otherwise free from contact with the walls and the bottom of the recessed sensor accommodation chamber.

2. The end piece according to claim 1, further provided with a force sensor.

3. A detachable end piece for attaching to a stinger body of a stinger of a vibration excitator, the detachable end piece receiving vibration from the stinger body, transferring the vibration to an object to be examined, and sensing a response from the object to the vibration, the end piece comprising:

a head end face for attachment to an object to be examined;

an opposite end opposite the head end face, said opposite end provided with stinger attachment means for detachably attaching the end piece to a stinger body; and a recessed sensor accommodation chamber arranged in the head end face, wherein the end piece has a ring-shaped appearance.

4. A force transmittal member comprising:

a force-transmitting body having a head end face for mounting on an object to be examined, and an opposite end face for receiving a stimulus force, the force-transmitting body transferring the force to an object to be examined, and sensing a response from the object to the force;

a recessed sensor accommodation chamber having walls and a bottom and arranged in the head end face of the force-transmitting body, the recessed sensor accommodation chamber completely situated in the force-transmitting body;

a vibration sensor arranged in the recessed sensor accommodation chamber; and elastic means coupling the sensor to the recessed sensor accommodation chamber, the sensor otherwise free from contact with the walls and the bottom of the accommodation chamber.

5. The force transmittal member according to claim 4, wherein a force sensor is accommodated between the two end faces.

* * * * *